United States Patent
Coan et al.

(10) Patent No.: US 8,398,755 B2
(45) Date of Patent: Mar. 19, 2013

(54) INTEGRATED MEMBRANE MODULE FOR GAS DEHYDRATION AND GAS SEPARATION

(75) Inventors: Frederick L. Coan, Antioch, CA (US); Jeffrey C. Schletz, Clayton, CA (US)

(73) Assignee: Generon IGS, Inc., Houston, TX (US)

( * ) Notice: Subject to any disclaimer, the term of this patent is extended or adjusted under 35 U.S.C. 154(b) by 263 days.

(21) Appl. No.: 13/072,817

(22) Filed: Mar. 28, 2011

(65) Prior Publication Data

US 2011/0239866 A1    Oct. 6, 2011

Related U.S. Application Data

(60) Provisional application No. 61/320,841, filed on Apr. 5, 2010.

(51) Int. Cl.
*B01D 53/22* (2006.01)

(52) U.S. Cl. ............ 96/9; 55/318; 55/482; 96/4; 96/7; 96/8; 96/10

(58) Field of Classification Search .............. 55/318, 55/482; 96/4, 7–10
See application file for complete search history.

(56) References Cited

U.S. PATENT DOCUMENTS

| | | | |
|---|---|---|---|
| 2,992,698 A | 7/1961 | Pearson | |
| 4,609,383 A * | 9/1986 | Bonaventura et al. | 95/46 |
| 4,613,436 A * | 9/1986 | Wight et al. | 210/232 |
| 4,657,743 A * | 4/1987 | Kanno | 422/46 |
| 4,783,201 A | 11/1988 | Rice | |
| 4,857,081 A * | 8/1989 | Taylor | 95/52 |
| 4,881,953 A | 11/1989 | Prasad | |
| 5,282,964 A * | 2/1994 | Young et al. | 210/321.8 |
| 5,584,914 A * | 12/1996 | Senoo et al. | 96/6 |
| 5,665,146 A * | 9/1997 | Mizobe | 96/7 |
| 5,820,655 A * | 10/1998 | Gottzmann et al. | 95/54 |
| 6,454,836 B1 * | 9/2002 | Koelmel et al. | 95/46 |
| 6,653,012 B2 * | 11/2003 | Suzuki et al. | 429/413 |
| 7,294,174 B2 | 11/2007 | Coan | |
| 7,497,894 B2 | 3/2009 | Jeffers | |
| 7,517,388 B2 | 4/2009 | Jensvold | |
| 7,578,871 B2 | 8/2009 | Jensvold | |
| 7,662,333 B2 | 2/2010 | Coan | |
| 8,038,960 B2 * | 10/2011 | Higashino | 422/198 |
| 2003/0010205 A1 * | 1/2003 | Bikson et al. | 95/52 |
| 2005/0252377 A1 | 11/2005 | Coan | |
| 2006/0065117 A1 | 3/2006 | Jain | |
| 2008/0072754 A1 | 3/2008 | Burban | |

FOREIGN PATENT DOCUMENTS

EP    1506807 A2    2/2005

* cited by examiner

*Primary Examiner* — Jason M Greene
*Assistant Examiner* — Anthony Shumate
(74) *Attorney, Agent, or Firm* — William H. Eilberg

(57) ABSTRACT

An integrated fiber membrane module for air dehydration and air separation includes dehydration and separation units disposed concentrically in a generally cylindrical module. Air flows through the outer dehydration unit, becomes dried, and is then directed, in an opposite direction, through the separation unit. The permeate gas from the separation unit serves as a sweep gas for the dehydration unit. A portion of dried gas produced by the dehydration unit may be used as a sweep gas for the separation unit, and also for the dehydration unit. The module makes it feasible to dry and separate air using a device which occupies relatively little space, and which is therefore especially suited for use in aircraft and in other cramped environments.

17 Claims, 4 Drawing Sheets

INTEGRATED MEMBRANE MODULE FOR GAS DEHYDRATION AND GAS SEPARATION

CROSS-REFERENCE TO PRIOR APPLICATION

Priority is claimed from U.S. provisional patent application Ser. No. 61/320,841, filed Apr. 5, 2010, the entire disclosure of which is hereby incorporated by reference.

BACKGROUND OF THE INVENTION

The present invention relates to a membrane-based module for non-cryogenic dehydration and separation of a gas.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

A polymer membrane becomes degraded in the presence of liquid water or water vapor. Therefore, the air directed into the membrane must be substantially free of water. For this reason, it is common to provide some form of dehydration unit which treats the gas before it enters the gas separation module. Polymers have been developed which separate water vapor from a gas. An example of such a polymer is given in U.S. Pat. No. 7,294,174, the disclosure of which is incorporated by reference herein.

The compressed air supplied to a membrane module must also be free of particulates and oil vapor, such as the particles of oil, and the oil vapors, which leak from the compressor. Carbon beds are typically used to remove such particles of oil, and the oil vapor, from the air stream. But excessive humidity also degrades the performance of such carbon beds, which is another reason why the air supplied to the module must be relatively dry.

In addition to a dehydration module and a carbon bed, one may provide heaters, moisture traps, and/or filters between the compressor and the membrane unit, as needed.

When the gas separation unit is installed on an aircraft, or in some other environment where space is limited, it becomes inconvenient or impractical to provide a dehydration membrane unit and a carbon bed, in addition to a gas separation module.

The present invention therefore provides an integrated module which combines the functions of a dehydration module and a gas-separation module, and which also includes an absorbent. The present invention therefore reduces the space required for such systems, and therefore makes it feasible to operate a membrane-based gas-separation system on board an aircraft, or in other limited-space environments.

SUMMARY OF THE INVENTION

The integrated membrane module of the present invention comprises two bundles of polymeric fiber membranes. The outer bundle, used as a first stage, is formed of a dehydration membrane, and the inner bundle, used as a second stage, is formed of a gas separation membrane. Both bundles are supported by a cylindrical central core.

Compressed air is introduced into the module, and flows through the first stage comprising dehydration fibers, and thereby becomes dried. The dried gas passes through a carbon bed, disposed within the housing which contains the entire module, on its way to the second stage membrane, i.e. the gas separation fibers. The non-permeate gas exiting the gas separation fibers comprises the dried product gas. The permeate gas produced by the gas separation fibers is directed, by suitable baffles, to the shell side of the dehydration fibers, and thus acts as a sweep stream for the dehydration stage.

In one embodiment, the module housing has a head or end closure which is screwed into the central core. In an alternative embodiment, the head or end closure includes flanges for engaging the tubesheets which hold the fibers. The latter arrangement is preferred, because it can be used with a thinner core, thus maximizing the space available for the fibers.

In another alternative embodiment, a portion of the dried gas produced by the dehydration fibers is used as a sweep stream for both the gas separation fibers and the dehydration fibers. In this embodiment, a portion of the core is hollowed, and the core has a plurality of holes. The dried gas flows into the hollowed portion of the core, preferably through a flow restrictor such as an orifice, and flows out through the holes so as to flow through the shell-side regions of the two stages. Thus, in this alternative, the integrated module can inherently produce one sweep stream for the separation stage and two sweep streams for the dehydration stage.

The present invention therefore has the primary object of providing an integrated module for drying and separating a gas.

The invention has the further object of providing an improved membrane-based gas separation system for use in a cramped environment, such as on board an aircraft.

The invention has the further object of providing an integrated module which removes water vapor and oil vapor from a gas, and for separating the gas into components.

The invention has the further object of providing an integrated gas separation module which does not require a sweep stream provided from outside the module.

The invention has the further object of minimizing the amount of plumbing required for operating a membrane-based gas separation unit in a cramped space, such as on board an aircraft.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
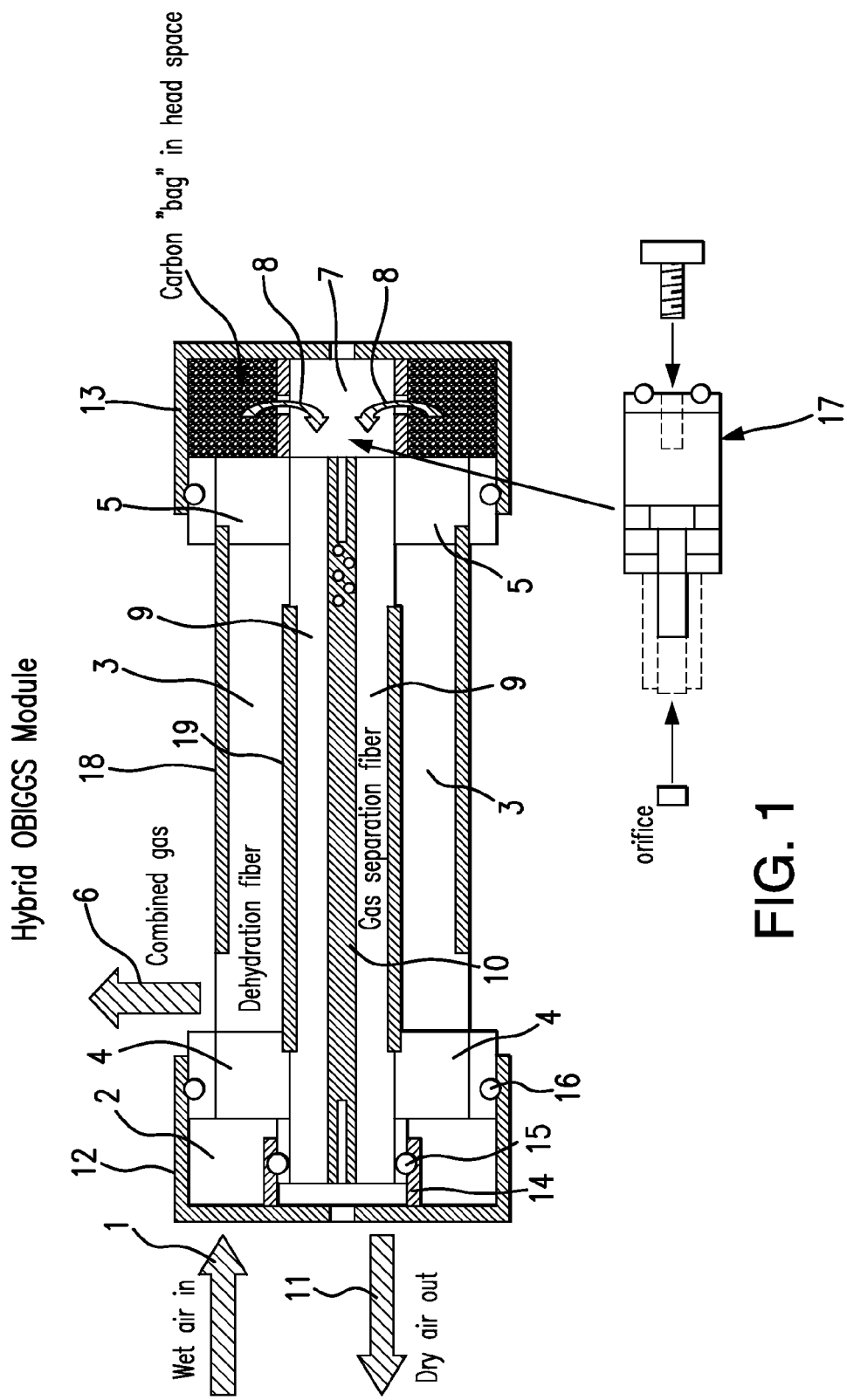
FIG. 1 provides a schematic diagram of an integrated module made according to the present invention, wherein a head or retainer is screwed into a core tube of the module.

FIG. 1 provides a schematic diagram of one embodiment of the integrated membrane module made according to the principles of the present invention. The module is known as an OBIGGS module, which means "on-board inert gas generation system". An OBIGGS module is especially intended for use on an aircraft, or in other relatively cramped environments.

The integrated module of the present invention preferably includes a plurality of polymeric fibers intended for use in gas dehydration, arranged generally concentrically around a plurality of polymeric fibers intended for use in gas separation. The module comprises a two stage unit, the first stage being for dehydration and the second stage being for gas separation. In the drawings, the fibers are symbolically indicated, but for convenience of illustration, the individual fibers, which are both tiny and numerous, are not explicitly drawn.

In the figures, it has been assumed that the input gas is air. In a more general case, the invention could be used with gases other than air.

In the embodiment of FIG. 1, relatively wet air (i.e. air which still may contain a significant amount of water vapor) enters the module as indicated by arrow 1. The air is ducted directly into head space 2. The dehydration fiber is provided in an annular structure 3 held at both ends by tubesheets 4 and 5. The wet air enters the hollow bores of the fibers which extend through tubesheet 4, and flows through the fibers. The permeate gas is primarily water vapor, and is conducted away from the module as indicated by arrow 6. The non-permeate gas, which flows through tubesheet 5, comprises the dried gas which is the product gas of the dehydration stage.

The dried gas flows through head space 7, which contains a carbon bag, occupying all or substantially all of the head space. The carbon in the bag comprises an absorbent bed which removes most residual oil and oil vapor from the gas. The carbon may be provided in the form of a pre-packaged carbon bed.

The dried gas then is directed, by suitable baffles, to flow into the gas separation fibers, as indicated by arrows 8. In particular, the dried gas flows through tubesheet 5, this time from right to left as shown in FIG. 1, and flows through the bores of the gas separation fibers 9. For air separation, a preferred material to be used for the fiber is tetrabromo bis-hydroxyphenylfluorene polycarbonate (TBBHPF-PC). The invention is not limited to any particular material, however.

The gas separation fibers surround central core 10. The core can simply be a solid structure which provides support to both concentric fiber modules and to the tubesheets. Alternatively, the core may be about 80-85% solid, and may have a hollow portion to accommodate a sweep gas, as will be explained in more detail later.

The non-permeate gas which emerges from the gas separation fibers comprises the dry product gas, and exits as indicated by arrow 11. In some applications, such as where the integrated module is used for making an inerting gas, this product gas is dried nitrogen, or a dried gas which comprises nitrogen-enriched air.

The permeate gas, which flows through the gas separation fibers, is directed by suitable baffling to act as a sweep gas for the dehydration fiber, and is then combined with the permeate gas of the dehydration fiber so as to exit the module as shown by arrow 6. Thus, arrow 6 represents the flow of a combined gas which includes the permeate gas of the dehydration stage and the permeate gas of the separation stage. The heavy lines 18 and 19 represent baffles which define barriers to gas flow, and which therefore force the gases to flow only through gaps where the baffles are not present. The baffles may comprise sheets of Mylar or other plastic material.

The concentric dehydration and gas separation modules are held by end closures or "heads" 12 and 13. The head 12 includes extension 14 which supports the gas separation fiber through a sealing relationship, as indicated by O-ring 15. A similar sealing relationship, with the tubesheet 4, is formed by O-ring 16.

On the right-hand side of the embodiment of FIG. 1, the head 13 is retained on the module by screwing it into the module, as indicated by the detail drawing 17. In particular, the head is screwed into the central core.

Figure 2:
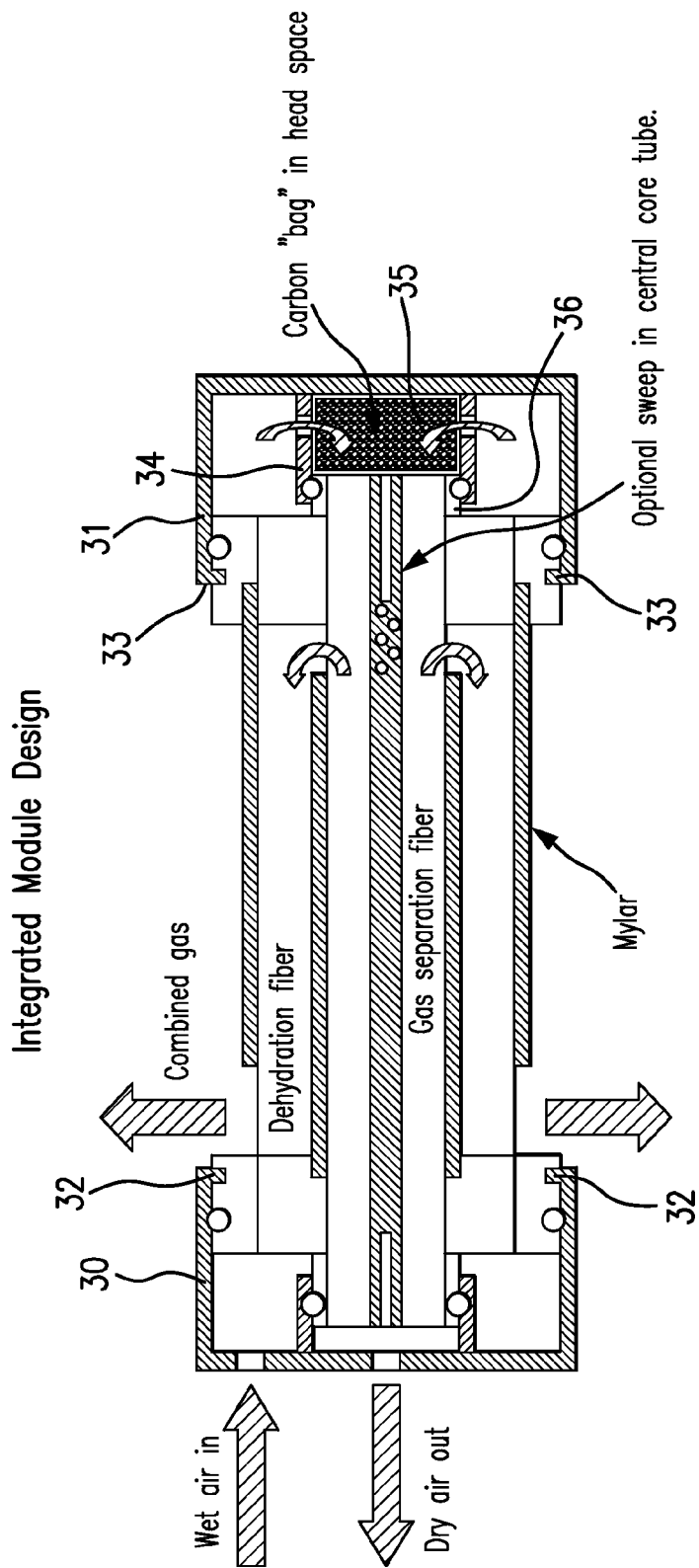
FIG. 2 provides a schematic diagram of another embodiment of the integrated module of the present invention, wherein the head or retainer is attached to the module by a flange.

The embodiment of FIG. 2 is generally similar, and works in a generally similar manner, as the embodiment of FIG. 1. Some structural features of the embodiment of FIG. 1 have been modified, and the embodiment of FIG. 2 is considered preferred.

In the embodiment of FIG. 2, both heads or end closures 30 and 31 include flanges 32 and 33 which engage the tubesheets. Unlike the embodiment of FIG. 1, in the embodiment of FIG. 2, it is not necessary to screw the head into the central core. Instead, an extension 34 of the head 31 defines a chamber which contains the carbon bag 35. The extension forms a seal with cylindrical member 36. Member 36 is preferably made of the same material as the tubesheet, but does not itself contain any fiber. The member 36 defines a machined surface suitable for creating a seal, as shown.

An advantage of the structure of the embodiment of FIG. 2 is that, because it does not require that the head be screwed into the central core, the central core can be made of much smaller diameter. Thus, with this embodiment, it is possible to provide more fiber, either for dehydration or gas separation, or both, without increasing the overall volume of the integrated module.

The flow of gas in the embodiment of FIG. 2 is essentially the same as in that of FIG. 1, except that the carbon bed does not occupy the entire interior of the head space. Thus, as in the embodiment of FIG. 1, the permeate gas produced by the gas separation fiber is combined with the permeate gas produced by the dehydration fiber to form a combined gas which exits the module.

In the embodiment described above, the permeate stream from the gas separation fiber is used as a sweep stream for the dehydration fiber, thus eliminating the need for a second and separate sweep stream, as is often required for a dehydration membrane.

Figure 4:
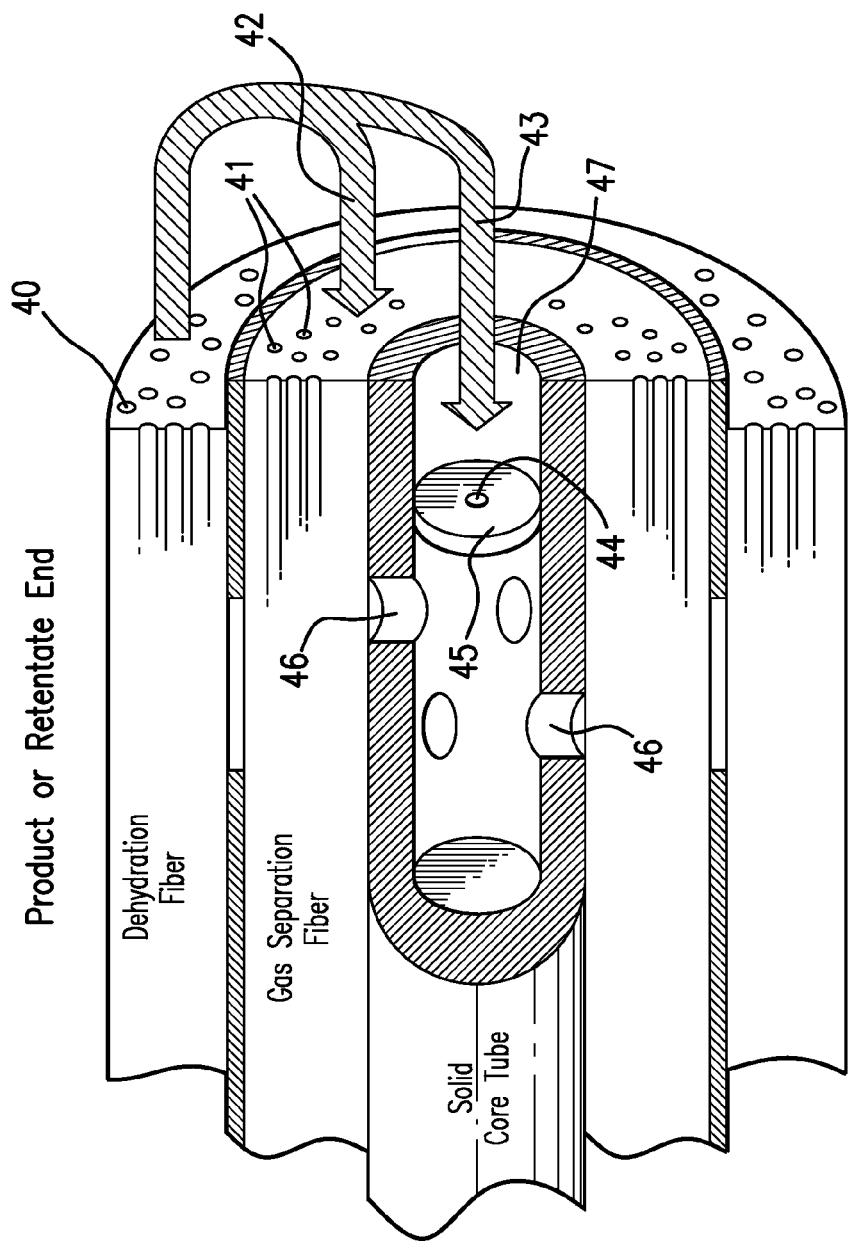
FIG. 4 provides a fragmentary cross-sectional view of a portion of the product end of the integrated module of the present invention, illustrating an alternative embodiment wherein a portion of the dried gas from the dehydration membrane is used as a sweep stream.

FIG. 4 shows an alternative embodiment which provides an additional sweep stream for both the gas separation fiber and the dehydration fiber. FIG. 4 provides a partial cross-sectional view of a portion of the right-hand side of the module. Dry gas from the dehydration fiber (i.e. the non-permeate gas) flows out of the bores of the dehydration fiber, symbolically represented by reference numeral 40 and into the bores 41 of the gas separation fibers, as indicated by arrow 42. This flow accounts for most (about 97%) of the gas flow out of the dehydration fibers. A small part of the dry gas stream enters the hollowed-out end 47 of the central core, as indicated by arrow 43.

In the embodiment shown, the core tube is solid except at one end (shown in detail in FIG. 4), where it has been hollowed as shown by reference numeral 47. Preferably, only about 3% or less of the dry gas enters the central core. An orifice plate 45, located in the hollowed portion 47 of the core, defines an orifice 44 which restricts the flow of dry gas into the core tube. The orifice plate is drawn in a rotated position, for purposes of illustration, i.e. to show the orifice. In practice the orifice plate is oriented so that it is substantially perpendicular to the gas flow.

The dry gas which flows through the orifice in the orifice plate then exits the core tube through the circular holes 46 shown in the drawing. Such gas therefore flows, as shown by the arrows, to the shell side of the gas separation fibers, and eventually to the shell side of the dehydration fibers. The gas is caused to flow due to the fact that the initial gas has been pressurized, and the gas flowing over and around the shell side of the fibers retains some pressure above ambient. The gas flow is channeled by the baffles described above. Thus, this gas acts as a sweep gas, first for the gas separation fibers and then for the dehydration fibers.

In the above example, a small amount of the dried interstage gas is combined with the permeate gas produced by the gas separation fibers to create a sweep gas for the dehydration fibers. In this way, the degree of water vapor removal by the dehydration fibers is further enhanced, and the dew point of the product gas can be lowered.

In the embodiment of FIG. 4, there is thus one sweep gas for the separation stage (i.e. the dried gas entering the core tube), and two sweep gases for the dehydration stage (i.e. the dried gas entering the core tube and the permeate gas from the separation stage).

As explained above, the embodiment of FIG. 4 requires that a portion of the core be hollowed out, at the right-hand side, as shown in the drawing by reference numeral 47, and that a plurality of exit holes 46 be formed in the tube to allow the gas entering the core tube to exit as desired. If the additional sweep is not required, the core tube can be constructed without any exit holes, and the core itself can be made completely solid (and not a tube), i.e. without any hollowed portion. In the latter case, substantially all of the dry gas would flow into the gas separation fiber, as the solid core would block any gas flow.

If the additional sweep gas is used, and depending on the purpose of the sweep stream, the additional sweep gas can be introduced at any point along the inner bundle. That is, the placement of the holes in the core tube controls the locations at which the gas is introduced into the shell side of the fibers.

EXAMPLE

Figure 3:
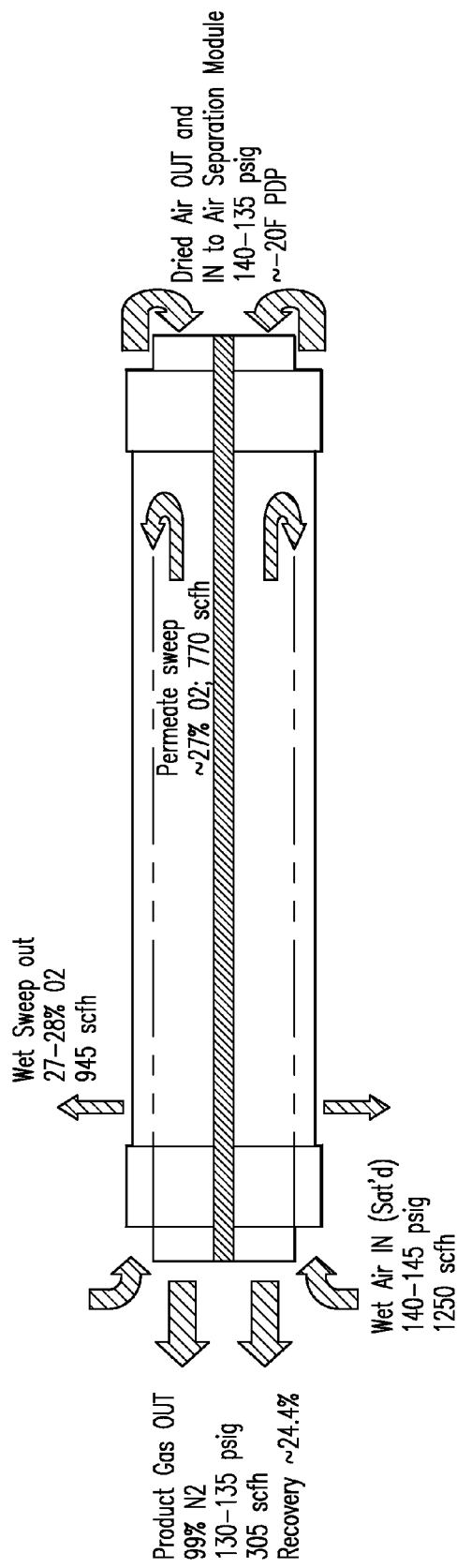
FIG. 3 provides a schematic diagram of the integrated module of the present invention, indicating flow rates, pressures, and purities in an example of the operation of the invention.

An Example of the use of an integrated module made according to the present invention is illustrated in FIG. 3. FIG. 3 is annotated with various parameters of concentration, pressure, and flow, as well as indicating dimensions used in this particular Example. In this Example, the inner air separation bundle accounted for about 65% of the area of the tubesheet, and had a diameter of 8 cm (about three inches). The outer air dehydration bundle accounted for about 35% of the area of the tubesheet, and comprised a concentric ring which was 1 cm in thickness. These values are just one example, and the invention should not be deemed limited to any one set of dimensions.

The present invention has the advantage that it eliminates the need for separate module cases for gas separation and dehydration. It also does not require a separate carbon filter housing, and associated plumbing, because the carbon is located inside the head or end closure of the module. The invention combines the pre-treatment (dehydration) and gas separation modules into a single cased unit, thereby reducing the size of the assembly.

The present invention also allows for the direct use of the permeate stream of the gas separation fiber as a sweep stream for the dehydration fiber, without the need for external plumbing.

The integrated module of the present invention incorporates the ability to install additional pretreatment stages such as the use of activated carbon, between the first stage (dehydration) and the second stage (gas separation).

The integrated module of the present invention also provides an optional additional sweep stream, through the use of a hollowed portion of the inner core tube.

The integrated module of the present invention allows the use of different fiber types within a single module housing.

Still another advantage of the invention results from the specific physical relationship between the two stages of the integrated module. Depending on the specific polymeric material used, the dehydration membrane may also inherently perform some selection between gaseous components. For example, some dehydration membranes may also at least partly select between oxygen and nitrogen. Because both membrane stages are enclosed within the same housing, the product gas of the dehydration stage is directed into the separation stage without passing between discrete units. Thus, for example, if the product of the dehydration membrane is a nitrogen-enriched product gas, which could pose a danger to personnel if allowed to escape, it can be handled more safely by the present invention because the gas does not leave the module until it has passed through the gas separation stage.

Another advantage of the present invention relates to the ability to use the first stage membrane to provide a "head start" for the second stage. In particular, as mentioned above, depending on the polymeric material chosen for the membrane, the dehydration membrane may also at least partly perform gas separation. To the extent that some separation of the gas has been performed by the dehydration membrane, the performance of the gas separation membrane will be further enhanced. For example, if the input to the separation membrane is nitrogen-enriched air, the separation membrane will more readily produce nitrogen of higher purity.

The invention can be modified in various ways, as will be apparent to the reader skilled in the art. Such modifications should be considered within the spirit and scope of the following claims.

What is claimed is:

1. An integrated module for non-cryogenic gas dehydration and gas separation, comprising:
   a) a gas separation unit containing a plurality of polymeric fibers, the fibers being made of a polymeric membrane selected to allow different gaseous components to permeate the membrane at different rates,
   b) a gas dehydration unit containing a plurality of polymeric fibers, the fibers being made of a polymeric membrane selected to separate water vapor from another gas, the gas dehydration unit being positioned to surround the gas separation unit,
   c) means for directing gas, exiting the dehydration unit, into the separation unit,
   wherein a wet gas entering the dehydration unit becomes dried and wherein the dried gas entering the separation unit becomes separated into components.

2. The module of claim 1, wherein the separation unit is generally cylindrical, and wherein the dehydration unit comprises an annular structure arranged concentrically around the separation unit.

3. The module of claim 2, wherein the separation unit is mounted around a central core.

4. The module of claim 3, wherein the module includes a housing which has an end closure which is screwed into the central core.

5. The module of claim 4, wherein the end closure includes an absorbent for removing residual oil and oil vapor from gas passing therethrough.

6. The module of claim 3, wherein the module includes tubesheets supporting fibers in the dehydration and separation units, and wherein the module further includes an end closure having at least one flange for engaging said tubesheets.

7. The module of claim 6, wherein the end closure includes an absorbent for removing residual oil and oil vapor from gas passing therethrough.

8. The module of claim 3, wherein the central core is substantially solid.

9. The module of claim 3, wherein the central core includes a hollow portion, the central core also including a plurality of holes for allowing gas in the hollow portion to flow into a shell-side region of the separation and dehydration units.

10. The module of claim 1, further comprising baffle means for directing permeate gas from the separation unit into a shell-side of the dehydration unit, and then out of the module.

11. The module of claim 9, further comprising baffle means for directing a first permeate gas from the separation unit into a shell-side region of the dehydration unit, and then out of the module, and also for directing a second gas flowing through said holes into the shell-side region of the separation unit and the shell-side region of the dehydration unit, wherein said first and second gases together comprise a sweep stream for the dehydration unit, and flow out of the module.

12. An integrated module for non-cryogenic gas dehydration and gas separation, comprising:
   a) a gas separation unit containing a plurality of polymeric fibers, the fibers being made of a polymeric membrane selected to allow different gaseous components to permeate the membrane at different rates, the gas separation unit being formed over a generally cylindrical central core,
   b) a gas dehydration unit containing a plurality of polymeric fibers, the fibers being made of a polymeric membrane selected to separate water vapor from other gases, the gas dehydration unit having an annular form and being coaxial with said central core, wherein the separation and dehydration units and the central core together defining a generally cylindrical structure having first and second ends,
   c) a pair of end closures formed around said first and second ends, wherein at least one of said end closures defines a path for gas to flow from the dehydration unit to the separation unit, wherein said at least one end closure is screwed into the central core.

13. The module of claim 12, wherein said at least one end closure includes an absorbent for removing residual oil and oil vapor from gas passing therethrough.

14. The module of claim 12, further comprising baffle means for directing permeate gas from the separation unit into a shell-side region of the dehydration unit and then out of the module, and for directing permeate gas from the dehydration unit out of the module, wherein permeate gas from the separation unit and permeate gas from the dehydration unit become combined as a sweep gas for the module.

15. An integrated module for non-cryogenic gas dehydration and gas separation, comprising:
   a) a gas separation unit containing a plurality of polymeric fibers, the fibers being made of a polymeric membrane selected to allow different gaseous components to permeate the membrane at different rates, the gas separation unit being formed over a generally cylindrical central core, wherein at least a portion of the central core is hollow and has a plurality of holes,
   b) a gas dehydration unit containing a plurality of polymeric fibers, the fibers being made of a polymeric membrane selected to separate water vapor from other gases, the gas dehydration unit having an annular form and being coaxial with said central core, wherein the separation and dehydration units and the central core together defining a generally cylindrical structure having first and second ends,
   c) at least one tubesheet which supports fibers of the gas dehydration unit and the gas separation unit,
   d) a pair of end closures formed around said first and second ends, wherein at least one of said end closures defines a path for gas to flow from the dehydration unit to the separation unit, wherein said at least one end closure includes a flange which engages said tubesheet.

16. The module of claim 15, wherein said at least one end closure includes an absorbent for removing residual oil and oil vapor from gas passing therethrough.

17. The module of claim 15, further comprising baffle means for directing permeate gas from the separation unit into a shell-side region of the dehydration unit and then out of the module, and for directing permeate gas from the dehydration unit out of the module, and for directing gas from the hollow portion of the central core into a shell-side region of the separation unit and into a shell-side region of the dehydration unit and then out of the module.

* * * * *